US012373445B2

(12) United States Patent
Svetlov et al.

(10) Patent No.: US 12,373,445 B2
(45) Date of Patent: Jul. 29, 2025

(54) SYSTEM AND A METHOD OF TRAINING A MACHINE-LEARNING MODELS FOR SEARCH RESULTS RANKING

(71) Applicant: Direct Cursus Technology L.L.C, Dubai (AE)

(72) Inventors: Vsevolod Svetlov, Moscow (RU); Kirill Khrylchenko, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 0 days.

(21) Appl. No.: 18/426,178

(22) Filed: Jan. 29, 2024

(65) Prior Publication Data
US 2024/0256558 A1  Aug. 1, 2024

(30) Foreign Application Priority Data
Jan. 31, 2023 (RU) .......................... RU2023102134

(51) Int. Cl.
  *G06F 16/2457* (2019.01)
  *G06N 3/0455* (2023.01)
  *G06N 3/08* (2023.01)

(52) U.S. Cl.
  CPC ..... *G06F 16/24578* (2019.01); *G06N 3/0455* (2023.01); *G06N 3/08* (2013.01)

(58) Field of Classification Search
  None
  See application file for complete search history.

(56) References Cited

U.S. PATENT DOCUMENTS 10,706,450 B1 * 7/2020 Tavernier ............ G06F 16/9535
10,810,193 B1   10/2020 Subramanya et al.
11,113,289 B2    9/2021 Chan et al.
2013/0086024 A1  4/2013 Liu et al.
(Continued)

FOREIGN PATENT DOCUMENTS

CN    109857845 A    6/2019

OTHER PUBLICATIONS

Rahimi et al., "Explaining Documents' Relevance to Search Queries", Published on Nov. 2, 2021, Article 111, p. 24, https://arxiv.org/pdf/2111.01314.pdf.
(Continued)

*Primary Examiner* — Taelor Kim
(74) *Attorney, Agent, or Firm* — BCF LLP

(57) ABSTRACT

A method and system for training a machine-learning algorithm (MLA), including first and second machine-learning (ML) models to rank digital documents at a digital platform. The method comprises: receiving first historical data of past searches conducted by the given user over a given past period; receiving second historical data, a given portion of the second historical data including data of past searches conducted by the given user over a given past user session; jointly training both the first and second ML models to rank the in-use digital documents, the training comprising: training, based on the first historical data, the first ML model to generate a vector representation of the first historical data; and training, based on the vector representation of the first historical data and the second historical data, the second ML model to determine a respective likelihood value of the given user interacting with a given in-use digital document.

18 Claims, 7 Drawing Sheets

(56) References Cited

U.S. PATENT DOCUMENTS

| | | |
|---|---|---|
| 2015/0310487 A1 | 10/2015 | Xu et al. |
| 2017/0193072 A1 | 7/2017 | Vase et al. |
| 2020/0293568 A1 | 9/2020 | Lu et al. |
| 2021/0374205 A1 | 12/2021 | Volynets et al. |
| 2022/0172040 A1* | 6/2022 | Kazi ........................ G06N 3/08 |
| 2024/0054991 A1* | 2/2024 | Jain ......................... G06F 3/167 |

OTHER PUBLICATIONS

Schoop et al., "HindSight: Enhancing Spatial Awareness by Sonifying Detected Objects in Real-Time 360-Degree Video", Published on Apr. 19, 2018, Paper No. 143, pp. 1-12, https://doi.org/10.1145/3173574.3173717.

* cited by examiner

SYSTEM AND A METHOD OF TRAINING A MACHINE-LEARNING MODELS FOR SEARCH RESULTS RANKING

CROSS-REFERENCE

The present application claims priority to Russian Patent Application No. 2023102134, entitled "System and a Method of Training a Machine-Learning Models for Search Results Ranking", filed Jan. 31, 2023, the entirety of which is incorporated herein by reference.

FIELD OF TECHNOLOGY

The present technology relates to machine-learning methods, and more specifically, to methods and systems for training and using machine-learning models for search results ranking.

BACKGROUND

Web search is an important problem, with billions of user queries processed daily. Current web search systems typically rank search results according to their relevance to the search query, as well as other criteria. To determine the relevance of search results to a query often involves the use of machine learning algorithms (MLAs) that have been trained using multiple hand-crafted features to estimate various measures of relevance. This relevance determination can be seen as, at least in part, as a language comprehension problem, since the relevance of a document to a search query will have at least some relation to a semantic understanding of both the query and of the search results, even in instances in which the query and results share no common words, or in which the results are images, music, or other non-text results.

Recent developments in neural natural language processing include use of "transformer" machine learning models, as described in Vaswani et al., "Attention Is All You Need," *Advances in neural information processing systems*, pages 5998-6008, 2017. A transformer is a deep learning model (i.e. an artificial neural network or other machine learning model having multiple layers) that uses an "attention" mechanism to assign greater significance to some portions of the input than to others. In natural language processing, this attention mechanism is used to provide context to the words in the input, so the same word in different contexts may have different meanings. Transformers are also capable of processing numerous words or natural language tokens in parallel, permitting use of parallelism in training.

Transformers have served as the basis for other advances in natural language processing, including pretrained systems, which may be pretrained using a large dataset, and then "refined" for use in specific applications. Examples of such systems include BERT (Bidirectional Encoder Representations from Transformers), as described in Devlin et al., "BERT: Pre-training of Deep Bidirectional Transformers for Language Understanding," *Proceedings of NAACL-HLT 2019*, pages 4171-4186, 2019, and GPT (Generative Pre-trained Transformer), as described in Radford et al., "Improving Language Understanding by Generative Pre-Training," 2018.

Broadly speaking, for the search ranking tasks, the transformers can be trained to determine relevance parameters of search results provided by a digital platform (such as a search engine, as an example) to a given user. For example, such relevance parameters may be represented by likelihood values of user interaction (such as a click) of the given user with the search results. More specifically, in response to the given user submitting a given search query, the digital platform can be configured to identify a respective set of digital documents (such as web documents, for example) responsive to the given search query. Further, both (i) the given search query and (ii) the respective set of digital documents can be fed to a transformer-based machine-learning (ML) model, trained based on specifically organized training data, for determining the rankings.

However, with the growing demand for higher accuracy in ranking the search results, it may be required to provide more input data to the transformer-based ML model, along with the given search query and the respective set of documents, which may pose certain challenges for effective operation of the transformer-based ML model in real time.

Certain prior art approaches have been proposed to tackle the above-identified technical problem.

An article entitled *"EXPLAINING DOCUMENTS' RELEVANCE TO SEARCH QUERIES"*, authored by Rahimi et al., discloses GenEx, a generative model to explain search results to users. According to the authors, GenEx explains a search result by providing a terse description for the query aspect covered by that result. GenEx is proposed as a novel model based on the Transformer architecture. To represent documents with respect to the given queries and yet not generate the queries themselves as explanations, two query-attention layers and masked-query decoding are added to the Transformer architecture. The model is trained without using any human-generated explanations. Training data are instead automatically constructed to ensure a tolerable noise level and a generalizable learned model.

SUMMARY

Developers of the present technology have appreciated that the accuracy of the search results ranking for the given user could be improved if, when determining the relevance parameter for the respective set of digital documents, the transformer-based ML model, aside from the current pair of "the given query—the respective set of digital documents", also considered current as well as more general interests of the given user with respect to the digital documents.

To that end, the developers have devised an architecture of an MLA that can be configured to consider (i) recent historical data associated with the given user, such as past user interactions thereof with other search results over a current user session at the digital platform, as well as (ii) larger historical data, having been accumulated over a longer period than the recent historical data. More specifically, in accordance with at least some non-limiting embodiments of the present technology, the MLA comprises two transformer-based ML models: (i) a first one, which is configured to generate a vector representation of the larger historical data; and (ii) a second one, which is configured to use the recent historical data along with the vector representation of the larger historical data to determine the relevance parameters for the search results.

Accordingly, such an architecture of the MLA allows processing the larger historical data offline, thereby enabling to save online computational resources of a server executing the MLA. This may thus allow increasing both the accuracy and effectiveness of determining the relevance parameters for the search results in real time.

More specifically, in accordance with a first broad aspect of the present technology, there is provided a computer-implemented method of training a machine-learning algorithm (MLA) to rank in-use digital documents at a digital platform. The MLA comprises a first ML model and a second ML model. The method is executable by a processor. The method comprises: receiving, by the processor, a first historical data including: (i) a first plurality of training queries submitted by a given user to the digital platform over a given past period; and (ii) respective sets of training digital documents generated, by the digital platform, during the given past period in response to submitting thereto each one of the first plurality of training queries; receiving, by the processor, a second historical data, a given portion of the second historical data including: (i) a second plurality of training queries submitted by the given user to the digital platform over a given past training user session, the given past training user session being shorter and more recent than the given past period; and (ii) respective sets of training digital documents generated, by the digital platform, during the given past training user session in response to submitting thereto each one of the second plurality of training queries, a given training digital document generated during any one of the given past period and the given past training user session including a respective indication of a user interaction of the given user with the given training digital document; and jointly training, by the processor, both the first and second ML models to rank the in-use digital documents, the training comprising: organizing, by the processor, the first historical data into a first plurality of training digital objects, a given one of which includes: (i) a given one of the first plurality of training queries; and (ii) the respective set of training digital documents generated in response to the given one of the first plurality of training queries during the given past period; feeding, by the processor, the first plurality of training digital objects to the first ML model to train the first ML model to generate a vector representation of the first historical data; generating, by the processor, based on the second historical data, a second plurality of training digital objects, a given one of which includes: (i) a given one of the second plurality of training queries; (ii) the respective set of training digital documents generated in response to the given one of the second plurality of training queries during the given training user session; and (iii) the vector representation of the first historical data; and feeding, by the processor, the second plurality of training digital objects to the second ML model to train the second ML model to determine a respective likelihood value of the given user interacting with a given in-use digital document.

In some implementations of the method, a number of members of the first plurality of training digital objects is greater than a number of members of the second plurality of training digital objects.

In some implementations of the method, the user interaction of the given user with the given training digital document comprises at least one: (i) selecting the given training digital document from a respective set of training digital documents; (ii) dwelling on the given digital document; (iii) adding the given training digital document in favorites; (iv) engaging with the given training digital document for longer than a threshold engagement period; and (v) saving at least a portion of content of the given training digital document.

In some implementations of the method, the method further comprises: receiving, by the processor, a given in-use query submitted by the given user to the digital platform during a current in-use user session; retrieving, by the processor, a respective set of in-use digital documents responsive to the given in-use query; retrieving, by the processor, in-use historical data including: (i) a plurality of past in-use queries submitted by the given user to the digital platform over the current in-use user session prior to submitting the given in-use query; (ii) respective sets of past in-use training digital documents generated, by the digital platform, in response to submitting thereto each one of the plurality of past in-use training queries, a given past in-use training digital document of the respective sets of past in-use digital documents including the respective indication of the user interaction of the given user with the given past in-use training digital document; generating, by the processor, an in-use digital object including: (i) the given in-use query; (ii) the respective set of in-use digital documents; (iii) the plurality of past in-use queries; (iv) respective sets of past in-use training digital documents; and (v) the vector representation of the first historical data; feeding, by the processor, the in-use digital object to the second ML model of the MLA to determine, for each one of the set of in-use digital documents, the respective likelihood value of the given user interacting therewith; and ranking, by the processor, each one of the set of in-use digital documents in accordance with the respective likelihood values associated therewith.

In some implementations of the method, the method further comprises, prior to the retrieving the vector representation of the first historical data, updating, by the processor, the first historical data.

In some implementations of the method, the updating comprises at least one of shifting and extending the given past period towards a moment of submitting the given in-use query.

In some implementations of the method, the updating is executed at a predetermined frequency.

In some implementations of the method, each one of the first and second ML models is a neural network having an encoder-decoder architecture.

In some implementations of the method, the neural network is Transformer-based neural network.

In accordance with a second broad aspect of the present technology, there is provided a server for training a machine-learning algorithm (MLA) to rank in-use digital documents at a digital platform. The MLA comprises a first ML model and a second ML model. The server comprises a non-transitory computer-readable memory storing instructions; and a processor, which, upon executing the instructions, is configured to: receive a first historical data including: (i) a first plurality of training queries submitted by a given user to the digital platform over a given past period; and (ii) respective sets of training digital documents generated, by the digital platform, during the given past period in response to submitting thereto each one of the first plurality of training queries; receive a second historical data, a given portion of the second historical data including: (i) a second plurality of training queries submitted by the given user to the digital platform over a given past training user session, the given past training user session being shorter and more recent than the given past period; and (ii) respective sets of training digital documents generated, by the digital platform, during the given past training user session in response to submitting thereto each one of the second plurality of training queries, a given training digital document generated during any one of the given past period and the given past training user session including a respective indication of a user interaction of the given user with the given training digital document; and jointly train both the first and second ML models to rank the in-use digital documents, by: organizing the first historical data into a first plurality of training digital objects, a given one of which includes: (i) a given one of the first plurality of training queries; and (ii) the respective set of training digital documents generated in response to the given one of the first plurality of training queries during the given past period; feeding the first plurality of training digital objects to the first ML model to train the first ML model to generate a vector representation of the first historical data; generating, based on the second historical data, a second plurality of training digital objects, a given one of which includes: (i) a given one of the second plurality of training queries; (ii) the respective set of training digital documents generated in response to the given one of the second plurality of training queries during the given training user session; and (iii) the vector representation of the first historical data; and feeding the second plurality of training digital objects to the second ML model to train the second ML model to determine a respective likelihood value of the given user interacting with a given in-use digital document.

In some implementations of the server, a number of members of the first plurality of training digital objects is greater than a number of members of the second plurality of training digital objects.

In some implementations of the server, the user interaction of the given user with the given training digital document comprises at least one: (i) selecting the given training digital document from a respective set of training digital documents; (ii) dwelling on the given digital document; (iii) adding the given training digital document in favorites; (iv) engaging with the given training digital document for longer than a threshold engagement period; and (v) saving at least a portion of content of the given training digital document.

In some implementations of the server, the processor is further configured to: receive a given in-use query submitted by the given user to the digital platform during a current in-use user session; retrieve a respective set of in-use digital documents responsive to the given in-use query; retrieve in-use historical data including: (i) a plurality of past in-use queries submitted by the given user to the digital platform over the current in-use user session prior to submitting the given in-use query; (ii) respective sets of past in-use training digital documents generated, by the digital platform, in response to submitting thereto each one of the plurality of past in-use training queries, a given past in-use training digital document of the respective sets of past in-use digital documents including the respective indication of the user interaction of the given user with the given past in-use training digital document; generate an in-use digital object including: (i) the given in-use query; (ii) the respective set of in-use digital documents; (iii) the plurality of past in-use queries; (iv) respective sets of past in-use training digital documents; and (v) the vector representation of the first historical data; feed the in-use digital object to the second ML model of the MLA to determine, for each one of the set of in-use digital documents, the respective likelihood value of the given user interacting therewith; and rank each one of the set of in-use digital documents in accordance with the respective likelihood values associated therewith.

In some implementations of the server, prior to retrieving the vector representation of the first historical data, the processor is further configured to update the first historical data.

In some implementations of the server, the processor is configured to update the first historical data by executing at least one of shifting and extending the given past period towards a moment of submitting the given in-use query.

In some implementations of the server, the processor is configured to update the first historical data at a predetermined frequency.

In some implementations of the server, each one of the first and second ML models is a neural network having an encoder-decoder architecture.

In some implementations of the server, the neural network is Transformer-based neural network.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus, information includes, but is not limited to audiovisual works (images, movies, sound records, presentations, etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
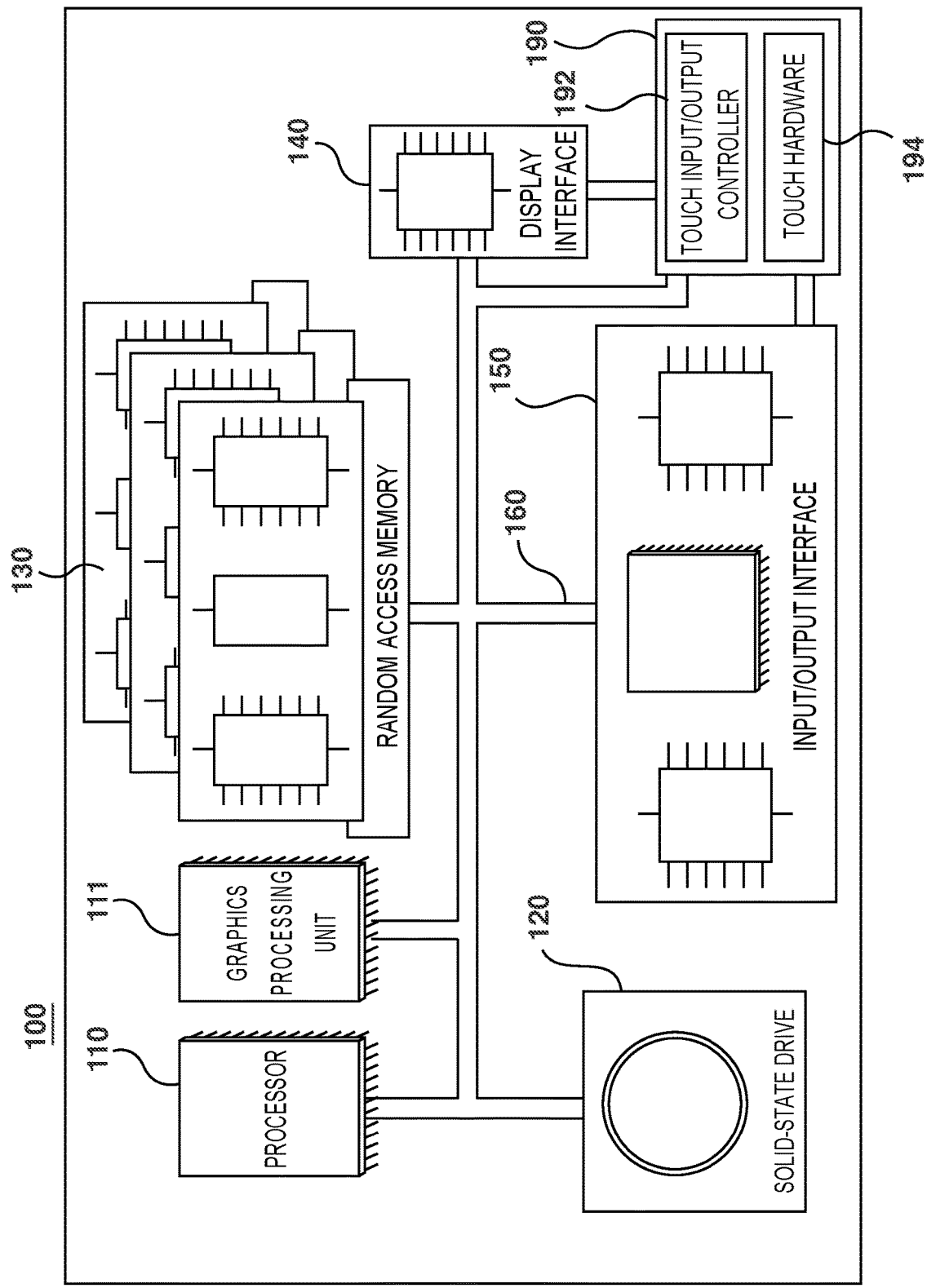
FIG. 1 depicts a schematic diagram of an example computer system for implementing certain non-limiting embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some non-limiting embodiments of the present technology, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of the display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190.

It is noted that some components of the computer system 100 can be omitted in some non-limiting embodiments of the present technology. For example, the touchscreen 190 can be omitted, especially (but not limited to) where the computer system is implemented as a server.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
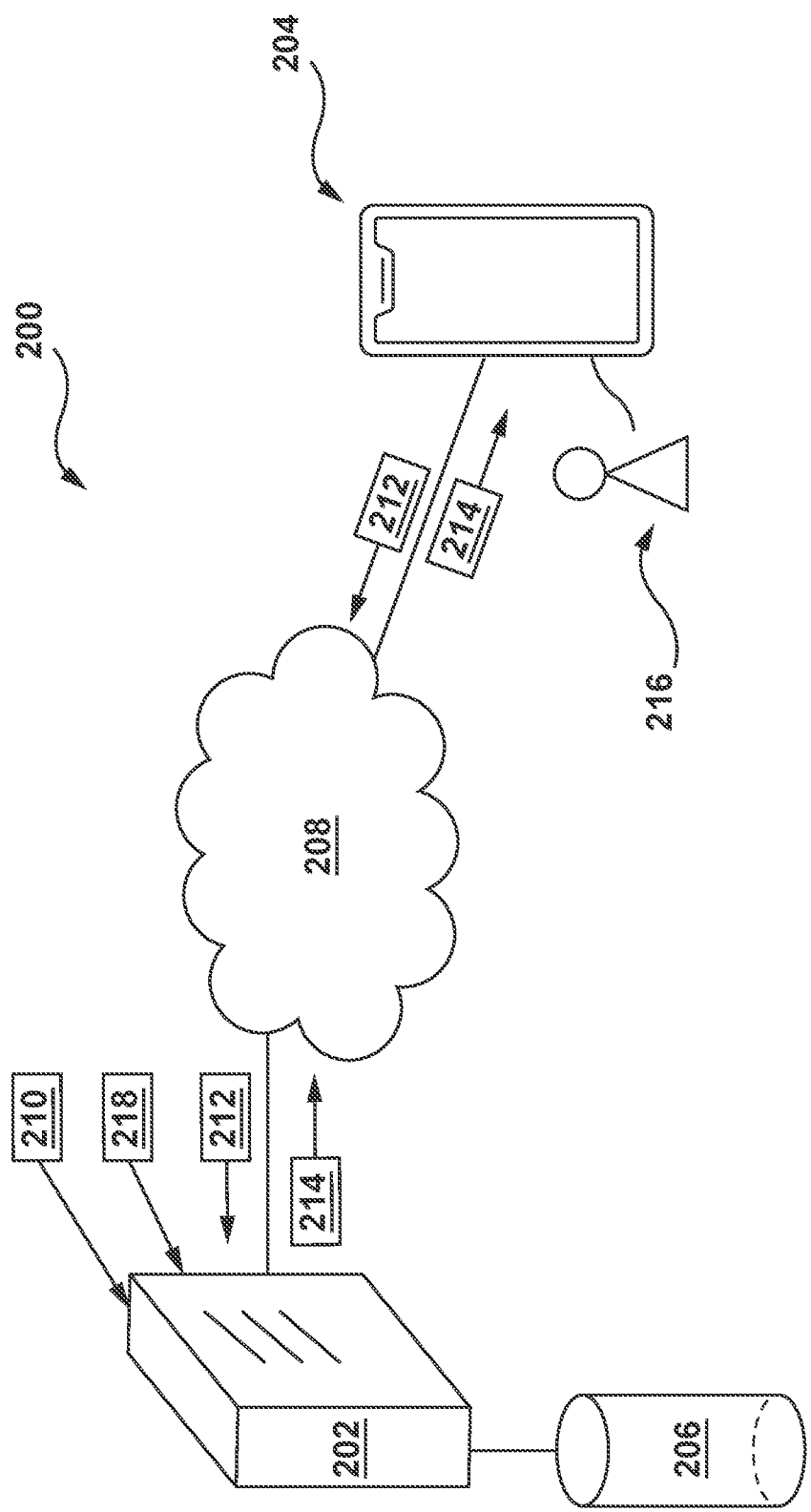
FIG. 2 depicts a networked computing environment suitable for training a machine-learning algorithm (MLA) to determine likelihood values of a given user interacting with digital documents of a digital platform, in accordance with certain non-limiting embodiments of the present technology.

With reference to FIG. 2, there is depicted a schematic diagram of a networked computing environment 200 suitable for use with some non-limiting embodiments of the systems and/or methods of the present technology. The networked computing environment 200 comprises a server 202 communicatively coupled, via a communication network 208, to an electronic device 204. In the non-limiting embodiments of the present technology, the electronic device 204 may be associated with a user 216.

In some non-limiting embodiments of the present technology, the electronic device 204 may be any computer hardware that is capable of running a software appropriate to the relevant task at hand. Thus, some non-limiting examples of the electronic device 204 may include personal computers (desktops, laptops, netbooks, etc.), smartphones, and tablets. It should be expressly understood that, in some non-limiting embodiments of the present technology, the electronic device 204 may not be the only electronic device associated with the user 216; and the user 216 may rather be associated with other electronic devices (not depicted in FIG. 2) having access to the digital platform 210 via the communication network 208 without departing from the scope of the present technology.

In some non-limiting embodiments of the present technology, the server 202 is implemented as a conventional computer server and may comprise some or all of the components of the computer system 100 of FIG. 1. In a specific non-limiting example, the server 202 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 202 is a single server. In alternative non-limiting embodiments of the present technology (not depicted), the functionality of the server 202 may be distributed and may be implemented via multiple servers.

In some non-limiting embodiments of the present technology, the server 202 can be configured to host a digital platform 210. Broadly speaking, the digital platform 210 is web resource configured to manage, that is, provide access to, present, and allow interactions with a plurality of various digital documents hosted by the digital platform 210. Generally speaking, types of digital documents hosted by the digital platform 210 depend on implementation thereof. For example, in some non-limiting embodiments of the present technology, the digital platform 210 is an audio streaming platform, such as a Spotify™ audio streaming platform, Yandex™ Music™ audio streaming platform, and the like, the plurality of digital documents can include various audio digital documents, such as audio tracks, audio books, podcasts, and the like. In another example where the digital platform 210 is a video hosting platform or a video streaming platform, such as a YouTube™ video hosting platform or a Netflix™ video streaming platform, for example, the plurality of digital documents can include various video digital documents, such as video clips, movies, news footages, and the like. In yet other example, where the digital platform is implemented as an online listing platform, such as a Yandex™ Market™ online listing platform, an Avito™ online listing platform, and the like, the plurality of digital documents can include advertisements of various items offered for sale, such as goods and services. In yet other example the digital platform 210 can be implemented as a as a search engine (such as a Google™ search engine, a Yandex™ search engine, and the like), and the plurality of digital documents can include web document that can further include digital documents of all the above listed types. It should be expressly understood that other implementations of the digital platform 210 as well as other respective types of digital documents hosted thereby are also envisioned.

Accordingly, to provide access to the plurality of digital documents to users of the digital platform 210, such as the user 216, the digital platform 210 can be configured to have a searching capability enabling the user 216 to submit search queries to the digital platform 210 (for example, via a dedicated user interface), in response to which the digital platform 210 can be configured to identify respective sets of digital documents.

According to certain non-limiting embodiments of the present technology, to store the plurality of digital documents potentially accessible via the communication network 208, the server 202 can be communicatively coupled to a database 206. To that end, in those embodiments where the digital platform 210 comprises a streaming platform or an online listing platform, the database 206 could be preliminarily populated with indications of the plurality of digital documents by digital document providers, such as musicians, production studios, sellers of the items, respectively. However, in those embodiments where the digital platform 210 is implemented as a search engine, the database 206 could be preliminarily populated with the indications of the plurality of digital documents via the process known as "crawling", which, for example, can be implemented, in some non-limiting embodiments of the present technology, also by the server 202. Further, although in the embodiments depicted in FIG. 2, the database 206 is depicted as a single entity, it should be expressly understood that in other non-limiting embodiments of the present technology, the functionality of the database 206 could be distributed among several databases. Also, in some non-limiting embodiments of the present technology, the database 206 could be accessed by the server 202 via the communication network 208, and not via a direct communication link (not separately labelled) as depicted in FIG. 2.

Also, as will become apparent from the description provided below, in additional non-limiting embodiments of the present technology, the server 202 can be configured to store, in the database 206, at least one of: (i) data indicative of users of the digital platform 210, such as the user 216, including certain user-specific features thereof; (ii) historical data of searches conducted by the user 216 at the digital platform 210. For example, according to certain non-limiting embodiments of the present technology, the user features of the user 216 can include, without limitation, sociodemographic characteristics of the user 216, which may further include, without limitation, an age of the user 216, a gender of the user 216, an employment status of the user 216, an average income of the user 216, and the like. Further, the data of the searches conducted by the user at the digital platform 210 can include, at least one of: (i) search queries submitted by the user 216 to the digital platform 210; (ii) respective sets of digital documents identified in response to the search queries; and (iii) user interactions of the user 216 with each one previously received set of digital documents.

Thus, according to certain non-limiting embodiments of the present technology, the user 216, using the electronic device 204, may submit a given query 212 to the digital platform 210, and the digital platform 210 can be configured to identify, in the database 206, a set of digital documents 214 responsive to the given query 212. Further, to aid the user 216 in navigating through the set of digital documents 214, the digital platform 210 can be configured to rank digital documents of the set of digital documents 214, for example, according to their respective degrees of relevance to the user 216.

In some non-limiting embodiments of the present technology, such degrees of relevance of each one of the set of digital documents 214 to the given user 216 may be represented by respective likelihood values of the given user 216 interacting with each one of the set of digital documents 214. For example, according to some non-limiting embodiments of the present technology, interacting with a given digital document may include at least one of: (i) the user 216 selecting the given digital document from the set of digital documents 214 by making at least one click on the given digital document, (ii) the user 216 making a long click on the given digital document, such as when the user 216 remains in the given digital document from a predetermined period (for example, 120 seconds); (iii) the user 216 dwelling on the given digital document within the set of digital document 214 for a predetermined period; (iv) the user 216 engaging with the given digital document for longer than a predetermined engagement threshold time, such as 2, 5, or 10 minutes, for example; (v) the user 216 saving at least a portion of the given digital document, such as by saving a web page in an HTML format or adding an audio track in a list of favorite audio tracks, as an example. It should be expressly understood that other types of user interactions of the given user 216 with digital documents are also envisioned without departing from the scope of the present technology.

In some non-limiting embodiments of the present technology, to determine the respective likelihood values for each digital document of the set of digital documents 214, the server 202 can be configured to train and further apply a machine-learning algorithm (MLA) 218.

Developers of the present technology have appreciated that for a more accurate determination of the respective likelihood values of the user 216 interacting with each one of the set of digital documents 214, the MLA 218 should be configured to consider both (1) more general dependencies in the user interactions of the user 216 with digital documents, which can be determined, for example, via analyzing larger historical data associated with the user 216, such as that accumulated for example, over one or more weeks, one or more months, one or more years, and the like; and (2) more recent dependencies in the user interactions of the user 216 with the digital items, which can be determined, for example, via analyzing, shorter and more recent historical data associated with the user 216 accumulated, for example, over a current user session of the user 216 at the digital platform 210, prior to submitting the given query 212.

However, analyzing such an amount of data in real time can be a very resource-intensive task for the processor 110 of the server 202, which may cause a user-perceivable delay in providing the set of digital documents 214, which can thus affect user satisfaction with the digital platform 210. To that end, the developers have devised an architecture of the MLA 218 including two interjoined machine-learning (ML) models, such that a first ML model is configured to: (i) receive the larger historical data; and (ii) generate a vector representation thereof; and a second ML model is configured to: (i) receive the more recent historical data; (ii) receive the vector representation of the larger historical data from the first ML model; and (iv) based on the vector representation of the larger historical data and the more recent historical data, determine the respective likelihood values of the user 216 interacting with each one of the set pf digital documents 214.

As will become apparent from the description provided below, such an architecture of the MLA 218 can thus enable to process the larger historical data for generating the vector representation thereof offline, hence allowing saving online computational resources of the server 250. Thus, the present methods and systems may allow increasing accuracy of ranking the set of digital documents 214 given limited resources of the server 202, which may further allow improving user experience of the user 216 with the digital platform 210.

It is not limited how a given one of the first and second ML models of the MLA 218 can be implemented; and in various non-limiting embodiments of the present technology, the given ML model can be based on neural networks (NNs), decision tree-based MLA, gradient boosted decision tree-based MLA, association rule learning based MLA, Deep Learning based MLA, inductive logic programming based MLA, support vector machines based MLA, clustering based MLA, Bayesian networks, reinforcement learning based MLA, representation learning based MLA, similarity and metric learning based MLA, sparse dictionary learning based MLA, genetic algorithms based MLA, and the like. However, in some non-limiting embodiments of the present technology, the given ML model can comprise a NN having an encoder-decoder architecture, such as a recurrent NN, a long short-term memory (LSTM) NN, and others. It should further be noted that embodiments where the first and second ML models of the MLA are implemented differently are also envisioned.

In some non-limiting embodiments of the present technology, each one of the first and second ML models of the MLA 218 could be implemented as a Transformer-based NN, such as a BERT NN. In these embodiments, the given ML model of the MLA 218 can be trained akin to natural language processing MLAs configured to determine missing tokens (such as words, phonemes, syllables, and the like) in a text based on a context provided by neighboring tokens therein.

Generally speaking, the server 202 can be said to be executing two respective processes in respect of the MLA 218. A first process of the two processes is a training process, where the server 202 is configured to train the MLA 218, based on a training set of data, to determine the respective likelihood values of the user 216 interacting with digital documents in the set of digital documents 214. A second process is an in-use process, where the server 202 executes the so-trained MLA 218 for respective likelihood values, which will be described further below, in accordance with certain non-limiting embodiments of the present technology.

The architecture of the MLA 218 including the first and second ML models implemented based on Transformer-based NNs as wells as training and in-use processes of such an MLA, in accordance with certain non-limiting embodiments of the present technology, will be described below with reference to FIGS. 4 to 6.

Communication Network

In some non-limiting embodiments of the present technology, the communication network 208 is the Internet. In alternative non-limiting embodiments of the present technology, the communication network 208 can be implemented as any suitable local area network (LAN), wide area network (WAN), a private communication network or the like. It should be expressly understood that implementations for the communication network are for illustration purposes only. How a respective communication link (not separately numbered) between each one of the server 202 and the electronic device 204 and the communication network 208 is implemented will depend, inter alia, on how each one of the server 202 and the electronic device 204 is implemented. Merely as an example and not as a limitation, in those embodiments of the present technology where the electronic device 204 is implemented as a wireless communication device such as a smartphone, the communication link can be implemented as a wireless communication link. Examples of wireless communication links include, but are not limited to, a 3G communication network link, a 4G communication network link, and the like. The communication network 208 may also use a wireless connection with the server 202.

Machine Learning Model Architecture

Figure 3:
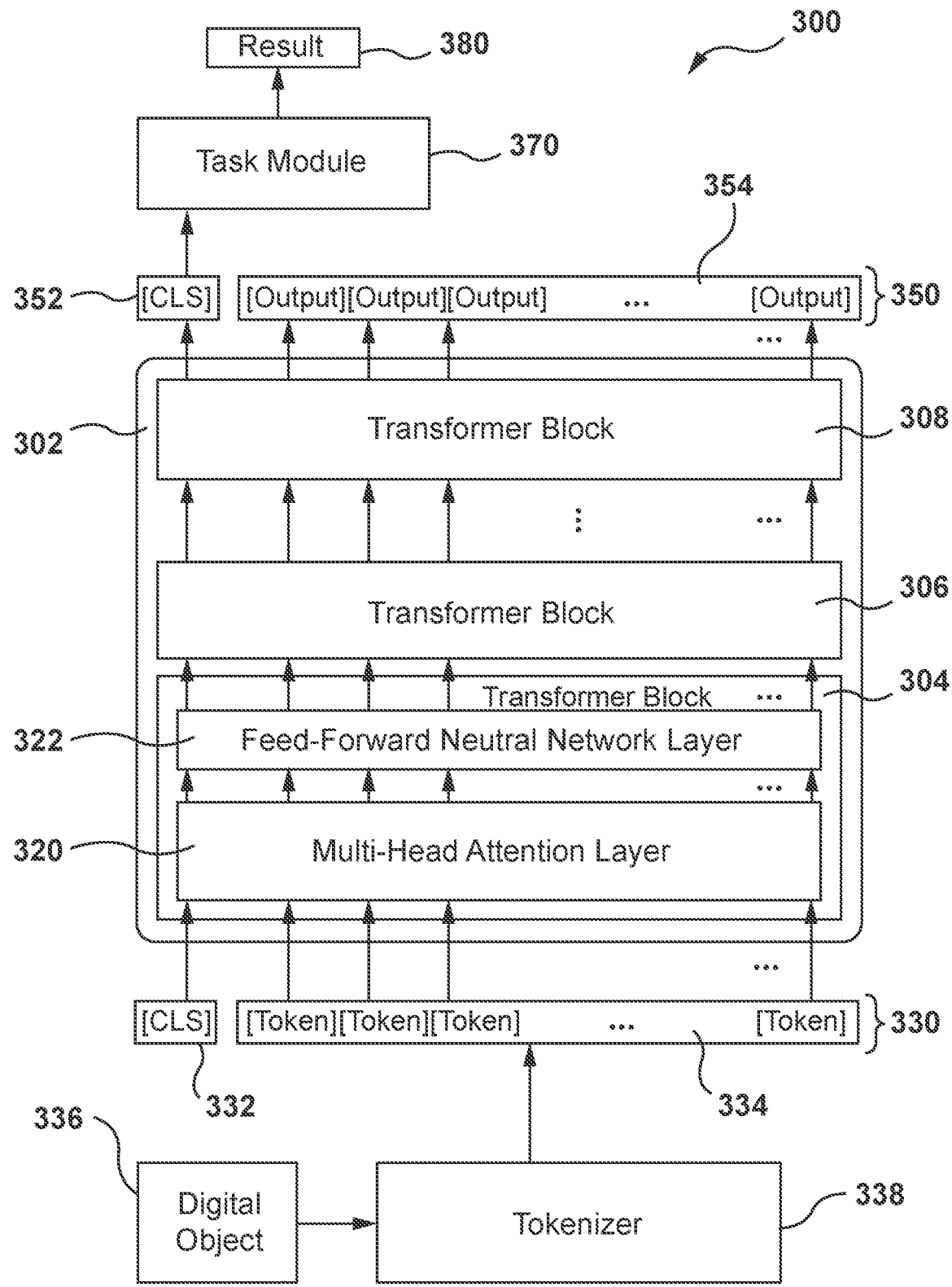
FIG. 3 depicts a block diagram of a machine-learning (ML) model architecture run by a server present in the networked computing environment of FIG. 2, in accordance with certain non-limiting embodiments of the present technology.

With reference to FIG. 3, there is depicted a block diagram of a ML model architecture 300 used for implementing the MLA 218, in accordance with certain non-limiting embodiments of the present technology. As noted above, in some non-limiting embodiments of the present technology, the ML model architecture 300 can be based on the BERT machine learning model, as described, for example, in the Devlin et al. paper referenced above. Like BERT, the ML model architecture 300 includes a transformer stack 302 of transformer blocks, including, for example, transformer blocks 304, 306, and 308.

Each of the transformer blocks 304, 306, and 308 includes a transformer encoder block, as described, for example, in the Vaswani et al. paper, referenced above. Each of the transformer blocks 304, 306, and 308 includes a multi-head attention layer 320 (shown only in the transformer block 304 here, for purposes of illustration) and a feed-forward neural network layer 322 (also shown only in transformer block 304, for purposes of illustration). The transformer blocks 304, 306, and 308 are generally the same in structure, but (after training) will have different weights. In the multi-head attention layer 320, there are dependencies between the inputs to the transformer block, which may be used, for example, to provide context information for each input based on each other input to the transformer block. The feed-forward neural network layer 322 generally lacks these dependencies, so the inputs to the feed-forward neural network layer 322 may be processed in parallel. It will be understood that although only three transformer blocks (transformer blocks 304, 306, and 308) are shown in FIG. 2, in actual implementations of the disclosed technology, there may be many more such transformer blocks in the transformer stack 302. For example, some implementations may use 12 transformer blocks in the transformer stack 302.

Inputs 330 to the transformer stack 302 include tokens, such as a [CLS] token 332, and tokens 334. The tokens 334 may for example represent words or portions of words. The [CLS] token 332 is used as a representation for classification for the entire set of tokens 334. Each of the tokens 334 and the [CLS] token 332 is represented by a vector. In some implementations, these vectors may each be, for example, 768 floating point values in length. It will be understood that a variety of compression techniques may be used to effectively reduce sizes (dimensionality) of the vectors. In some non-limiting embodiments of the present technology, the [CLS] token 332 can comprise a plurality of input [CLS] tokens, such as 2, 3, 6, or 10, for example, each one of which is a respective vector representation for classification of a different aspect of the tokens 334.

In some non-limiting embodiments of the present technology, there may be a fixed number of the tokens 334 that are used as the inputs 330 to the transformer stack 302. For example, in some non-limiting embodiments of the present technology, 1024 tokens may be used, while in other implementations, the transformer stack 302 may be configured to take 512 tokens (aside from the [CLS] token 332). Those of the inputs 330 that are shorter than this fixed number of tokens 334 may be extended to the fixed length by adding padding tokens, as an example.

In some implementations, the inputs 330 may be generated from a training digital object 336, such as at least one of a past digital document and a past query associated therewith, as will be described below, using a tokenizer 338. The architecture of the tokenizer 338 will generally depend on the training digital object 336 that serve as input to the tokenizer 338. For example, in some non-limiting embodiments of the present technology, the tokenizer 338 may involve use of known encoding techniques, such as byte-pair encoding, as well as use of pre-trained neural networks for generating the inputs 330.

However, in other non-limiting embodiments of the present technology, the tokenizer 338 can be implemented based on a WordPiece byte-pair encoding scheme, such as that used in BERT learning models with a sufficiently large vocabulary size. For example, in some non-limiting embodiments of the present technology, the vocabulary size may be approximately 120,000 tokens. In some non-limiting embodiments of the present technology, before applying the tokenizer 338, the inputs 330 can be preprocessed. For example, all words of the inputs 330 can be converted lowercase, and Unicode NFC normalization can further be performed. The WordPiece byte-pair encoding scheme that may be used in some implementations to build the token vocabulary is described, for example, in Rico Sennrich et al., "Neural Machine Translation of Rare Words with Subword Units", *Proceedings of the 54th Annual Meeting of the Association for Computational Linguistics* (*Volume* 1: *Long Papers*), pages 1715-1725, 2016.

In additional non-limiting embodiments of the present technology, after using the tokenizer 338, the generating the inputs 330 can further include applying, by the server 202, a positional embedding algorithm (not depicted) configured to register positional information within portions of the input training digital object 336. For example, if the input training digital object 336 includes a text sentence, the positional embedding algorithm can be configured to generate a vector indicative of positional information amongst words in that text sentence. It is not limited how the positional embedding algorithm is implemented; and may include, without limitation, a sinusoid positional embedding algorithm, a frame stacking positional embedding algorithm, and a convolutional positional embedding algorithm, as an example.

Outputs 350 of the transformer stack 302 include a [CLS] output 352, and a vector of outputs 354, including a respective output value for each of the tokens 334 in the inputs 330 to the transformer stack 302. The outputs 350 may then be sent to a task module 370. In some implementations, as is depicted in FIG. 3, the task module 370 uses only the [CLS] output 352, which serves as a representation of the entire vector of the outputs 354. This can be most useful when the task module 370 is being used as a classifier, or to output a label or value that characterizes the entire input training digital object 336, such as generating a relevance score—for example, the respective likelihood value of the user 216 interacting with the given digital document described above.

However, as will become apparent from the description provided hereinbelow, in those embodiments where [CLS] token 332 of the inputs 330 to the ML model architecture 300 comprises the plurality of input [CLS] tokens, the [CLS] output 352 can include a respective plurality of output [CLS] tokens, a number of which corresponds to that of the plurality of input [CLS] tokens of the inputs 330. Thus, the respective plurality of output [CLS] tokens defines a vector representation of an entirety of the inputs 330.

In some non-limiting embodiments of the present technology (not depicted in FIG. 3) all or some values of the vector of the outputs 354, and possibly the [CLS] output 352 may serve as inputs to the task module 370. This can be most useful when the task module 370 is being used to generate labels or values for each one of the tokens 334 of the inputs 330, such as for prediction of a masked or missing token or for named entity recognition. In some non-limiting embodiments of the present technology, the task module 370 may include a feed-forward neural network (not depicted) that generates a task-specific result 380, such as a relevance score or click probability. Other models could also be used in the task module 370. For example, the task module 370 may itself be a transformer or other form of neural network. Additionally, the task-specific result 380 may serve as an input to other models, such as a CatBoost model, as described in Dorogush et al., "CatBoost: gradient boosting with categorical features support", *NIPS* 2017.

It will be understood that the architecture of the ML model architecture 300 described above with reference to FIG. 3 has been simplified for ease of clarity and understanding of certain non-limiting embodiments of the present technology. For example, in an actual implementation of the ML model architecture 300, each of the transformer blocks 304, 306, and 308 may also include layer normalization operations, the task module 370 may include a softmax normalization function, and so on. One of ordinary skill in the art would understand that these operations are commonly used in neural networks and deep learning models such as the ML model architecture 300.

Further, as noted above, according to certain non-limiting embodiments of the present technology, the MLA 218 executed by the server 202 for ranking sets of digital documents identified by digital platform 210, such as the set of digital documents 214 responsive to the given query 212, can include two interconnected ML models implemented based on the machine ML model architecture 300.

Figure 4:
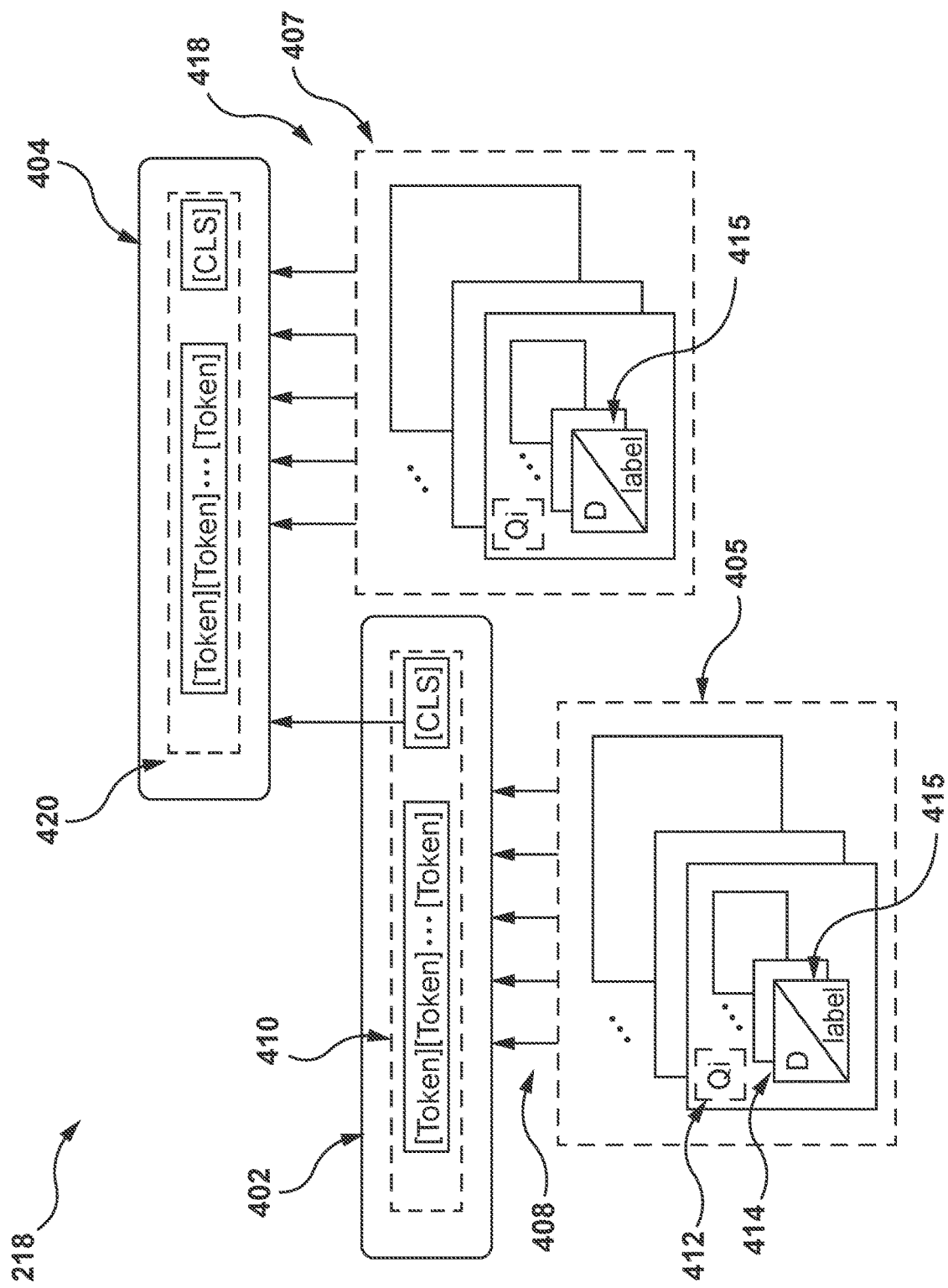
FIG. 4 depicts a schematic diagram of the server, present in the networked computing environment of FIG. 2, training the MLA including two ML interjoined models, each of which is implemented based on ML model architecture of FIG. 3, in accordance with certain non-limiting embodiments of the present technology.

With reference to FIG. 4, there is depicted an architecture of the MLA 218 implemented based on the ML model architecture 300, in accordance with certain non-limiting embodiments of the present technology.

As it can be appreciated, the architecture of the MLA 218 includes a first ML model 402 and a second ML model 404, each of which, in some non-limiting embodiments of the present technology, can be implemented similarly to the ML model architecture 300 described above. However, in other non-limiting embodiments of the present technology, each one of the first and second ML models 402, 404 can be implemented differently. For example, in some non-limiting embodiments of the present technology, the first ML model 402 can be implemented similarly to the ML model architecture 300; and the second ML model 404 can be implemented as a decision tree-based ML model, such as the CatBoost model also mentioned above. In another example, the first ML model 402 can be implemented similarly to the ML model architecture 300; and the second ML model 404 can be implemented as another NN having an encoder-decoder architecture, such as a recurrent NN or an LSTM NN.

As will become apparent from the description provided hereinbelow, in some non-limiting embodiments of the present technology, the first and second ML models 402, 404 can be interconnected therebetween so that first outputs 410 of the first ML model 402 is provided as part of second inputs 418 to the second ML model 404.

Training Process

According to certain non-limiting embodiments of the present technology, the server 202 can be configured to retrieve training data and based thereon train the MLA 218 to determine the respective likelihood values of the user 216 interacting with each one of the set of digital documents 214.

With continued reference to FIG. 4, in some non-limiting embodiments of the present technology, for training the MLA 218, the server 202 can be configured to retrieve two separate training sets of data for training each one the first and second ML models 402, 404. More specifically, the server 202 can be configured to: (i) retrieve historical data associated with each user of the digital platform 210; and generate, based on the historical data, a first plurality of training digital objects 405 for training the first ML model 402; and a second plurality of training digital objects 407, for training the second ML model 404.

In some non-limiting embodiments of the present technology, the historical data includes data of past searches conducted by the users of the digital platform 210 thereat. In some non-limiting embodiments of the present technology, the server 202 can be configured to retrieve the historical data directly from respective electronic devices of the users of the digital platform 210, such as the electronic device 204 of the user 216. However, in other non-limiting embodiments of the present technology, the server 202 can be configured to retrieve the historical data of the past searches from the database 206. In some non-limiting embodiments of the present technology, for generating the first and second plurality of training digital objects 405, 407, the server 202 can be configured to retrieve the historical data of the past searches the users of the digital platform 210 have conducted over a predetermined period, such as one or more weeks, one or more months, one or more years, and the like.

More specifically, in some non-limiting embodiments of the present technology, the historical data of the past searches, conducted by a given user of the digital platform 210, such as the user 216, includes a plurality of past queries submitted by the user 216 to the digital platform 210—such as a given past query 412. Further, for the given past query 412, the server 202 can be configured to retrieve, a respective set of past digital documents 414 that was identified as being responsive to the given past query 412. A given past digital document of the respective set of past digital documents 414 includes a respective value of a label 415, which is indicative of a past user interaction of the user 216 with the given past digital document upon receiving the respective set of past digital documents 414.

As noted hereinabove, the given past digital document of the respective set of past digital documents 414 can include electronic media content entities of various formats and types that are suitable for being transmitted, received, stored, and presented on a user electronic device, such as the electronic device 204 of the user 216, using suitable software, such as a browser, as an example, or another web application.

According to some non-limiting embodiments of the present technology, the past user interaction of the user 216 with the given past digital document of the respective set of past digital documents 414 may include at least one of: (i) a click of the user 216 on the given past digital document; (ii) a long click on the given past digital document, that is, remaining in the given past digital document after clicking thereon for a predetermined period (such as 2, 5, or 10 minutes); (iii) dwelling on the given past digital document over a predetermined period (such as 10 seconds), as an example; (iv) adding the given past digital document in a list of favorite digital documents, such as bookmarks of the browser application, as an example; (v) coping a portion of the given past digital document, such as a portion of text or an image therefrom; and (v) saving at least a portion of the given past digital document to an internal memory of the electronic device 204. It should be noted that other user interactions indicative of user interest of the user 216 towards the given past digital document are also envisioned.

Thus, the label 415 of the given past digital document may take a binary value, such as one of '1' (or 'Positive') if the user 216 has interacted with (such as clicked on) the given past digital document, and '0' (or 'Negative') if the user 216 has not interacted with the given past digital document upon receiving the respective set of past digital documents 414.

In additional non-limiting embodiments of the present technology, the given past query 412 can further include query metadata (not depicted), such as a geographical region from which the user 216 submitted the given past query 412, and the like. Similarly, the given past digital document of the respective set of past digital documents 414 can further include document metadata (not depicted), such as a title thereof, a web address thereof (for example, in the form of a URL), as an example.

Further, according to certain non-limiting embodiments of the present technology, based on different portions of the historical data associated with the user 216 described above, the server 202 can be configured to (i) generate a respective set of training digital objects of the first plurality of training digital objects 405 for training the first ML model 402; and (ii) generate a respective set of training digital objects of the second plurality of training digital objects 407 for training the second ML model 404.

Figure 5:
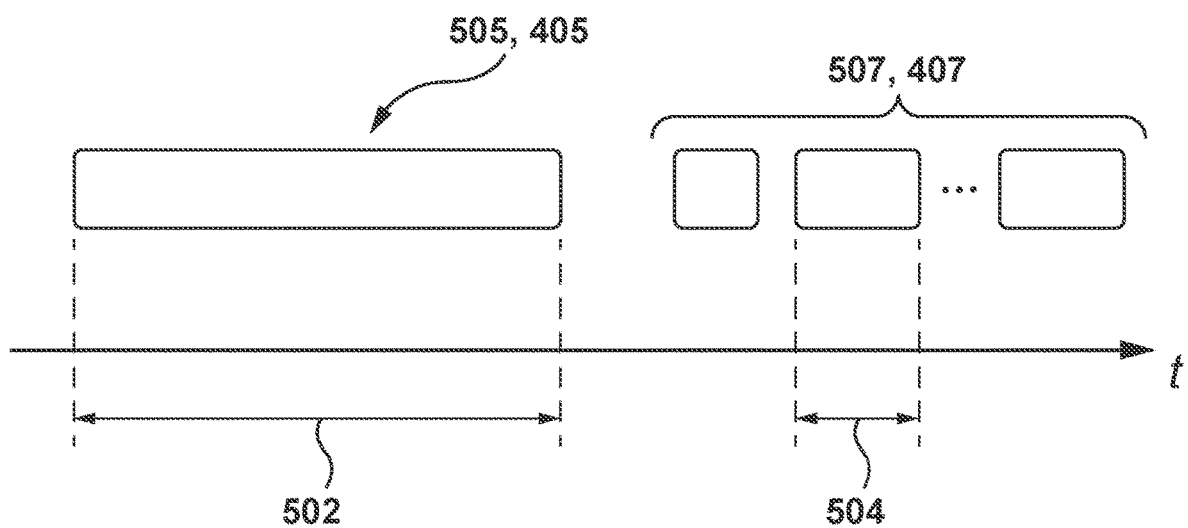
FIG. 5 depicts a time diagram of retrieving, by the server present in the networked computing environment of FIG. 2, historical data for training the MLA of FIG. 4, in accordance with certain non-limiting embodiments of the present technology.

With continued reference to FIG. 4 and with reference to FIG. 5, there is depicted a time diagram of the server 202 retrieving different portions of the historical data associated with the user 216 for generating the respective sets of training digital objects of the first and second pluralities of training digital objects 405, 407, in accordance with certain non-limiting embodiments of the present technology. More specifically, according to certain non-limiting embodiments of the present technology, the server 202 can be configured to organize the historical data associated with the user 216, into two portions: (i) first historical data 505 that includes data of the past searches conducted by the user 216 over a first period 502; and (ii) second historical data 507, a given portion of which includes data of the past searches conducted by the user 216 over a second period 504. As it can be appreciated from FIG. 5, according to certain non-limiting embodiments of the present technology, the second period 504 is shorter than the first period 502. For example, the first period 502 can be selected to be comparatively long, such as several weeks or months; whereas the second period 504 can be predetermined as being comparatively short, such as a several hours (1, 2, 5, or 7), a day, or a week, as an example. In some non-limiting embodiments of the present technology, the second period 504 may not have a fixed duration, and be selected to be equal to an entirety of a respective past user session of the user 216 at the digital platform 210. In these embodiments, the server 202 can thus be configured to organize the second historical data 507 such that each portion of the second historical data 507 corresponds to historical data associated with the user 216 accumulated over the respective past user session of the user 216.

Further, in some non-limiting embodiments of the present technology, the server 202 can be configured to organize the historical data associated with the user 216 such that every portion of the second historical data 507 is more recent than the first historical data 505. However, in other non-limiting embodiments of the present technology, at least one portion of the second historical data 507 can overlap with the first historical data 505. By doing so, the server 202 can be configured to determine respective sets of training digital objects of the first and second historical data 505, 507 for each user of the digital platform 210.

Further, based on the first historical data 505, the server 202 can be configured to generate the respective set of training digital objects of the first plurality of training digital objects 405 associated with the user 216 such that a given training digital object thereof includes: (i) the given past query 412, which was submitted by the user 216 during the first period 502; (ii) the respective set of past digital documents 414; and (iii) and respective values of the label 415 indicative of past user interaction of the user 216 with each past digital document, as mentioned above.

Further, in some non-limiting embodiments of the present technology, using the tokenizer 338 described above with respect to the ML model architecture 300, the server 202 can be configured to generate, based on the given digital object of the first plurality of training digital objects 405, respective values of first inputs 408 to the first ML model 402. Further, the server 202 can be configured to feed the first inputs 408 to the first ML model 402, thereby training the first ML model 402 to determine the respective likelihood values of the user 216 interacting with in-use digital documents, such as the digital documents of the set of digital documents 214 mentioned above. In this regard, in some non-limiting embodiments of the present technology, the server 202 can be configured to: (i) initialize the weights of the transformer blocks 304, 306, 308, of the first ML model 402, for example, randomly, and (ii) adjust the values thereof by minimizing a difference or a distance between predicted and actual values of the respective labels associated with each one of the past digital documents of the first plurality of training digital objects 405. For example, in some non-limiting embodiments of the present technology, the server 202 can be configured to determine the difference using a loss function, such as a Cross-Entropy Loss function, as an example, and further adjust the weights of the transformer blocks 304, 306, and 308 by minimizing the difference between the predicted and actual values of the respective labels associated with the past digital documents.

It should be expressly understood that other implementations of the loss function are also envisioned by the non-limiting embodiments of the present technology and may include, by way of example, and not as a limitation, a Mean Squared Error Loss function, a Huber Loss function, a Hinge Loss function, and others. Also, it is not limited how the server 202 can be configured to minimize the loss function, and in some non-limiting embodiments of the present technology, depends generally on the differentiability of the loss function. For example, if the loss function is continuously differentiable, approaches to minimizing it can include, without limitation, a Gradient Descent algorithm, a Newton's optimization algorithm, and others. In those embodiments where the loss function is non-differentiable, to minimize it, the server 202 can be configured to apply at least one of a Direct algorithms, Stochastic algorithms, and Population algorithms, as an example.

Thus, having trained the first ML model 402, based on the respective set of training digital objects of the first plurality of training digital objects 405 associated with the user 216, the server 202 can be configured to determine respective values of first outputs 410 including a first [CLS] output (not separately labelled). As mentioned above with respect to the ML model architecture 300, the first [CLS] output of the first outputs 410 defines, for each user of the digital platform 210, a vector representation of an entirety of the first plurality of training digital objects 405. More specifically, the first [CLS] output of the respective values of the first outputs 410 can be said to be indicative of the relationships between (i) the user features of the user 216; (ii) the given past query 412; (iii) document features of past digital documents of the respective set of past digital documents 414, such as titles and URLs thereof; and (iv) respective values of the label 415 indicative of past user interactions of the user 216 with each past digital document of the respective set of past digital documents 414. As the server 202 has generated the respective values of the first plurality of training digital objects 405 based on the first historical data 505, having been accumulated for the user 216 over the first period 502, as mentioned above, the first [CLS] output of first ML model 402 can be said to be a vector representation of an entirety of the first historical data 505 associated with the user 216.

Further, in some non-limiting embodiments of the present technology, the server 202 can be configured to store the first outputs 410 associated with the user 216, including the first [CLS] output, in an internal memory of the server 202, such as the solid-state drive 120 thereof, for further use the first outputs 410 for training the second ML model 404 and using the MLA 218, in general, as will be described below.

Similarly, the server 202 can be configured to generate respective values of the first outputs 410 for each other one of the users of the digital platform 210. To that end, the server 202 can be configured to: (i) retrieve the first historical data 505 associated with a given other user of the digital platform 210; (ii) generate, based on the first historical data 505 associated with the given other user, the respective set of training digital objects of the first plurality of training digital objects 405; (iii) feed the respective set of training digital objects of the first plurality of training digital objects 405 to the first ML model 402 to determine the respective values of the first outputs 410 associated with the given other user of the digital platform 210; and (iv) store the respective values of the first outputs 410 for further use as will be described below.

Further, using the respective values of the first outputs 410 determined via training the first ML model 402 and the given portion of the second historical data 507 associated with the user 216, obtained as described above, in some non-limiting embodiments of the present technology, the server 202 can be configured to generate the respective set of training digital objects of the second plurality of training digital objects 407 associated with the user 216 for training the second ML model 404. More specifically, according to certain non-limiting embodiments of the present technology, a given training digital object of the second plurality of training digital objects 407 includes: (i) a given past query (not separately labelled) submitted by the user 216 during the second period 504; (ii) a respective other set of past digital documents having been identified, by the digital platform 210, as being responsive to the given past query submitted during the second period 504; and (iii) the first [CLS] output of the respective values of the first outputs 410 of the first ML model 402, representative of the first historical data 505 associated with the user 216. Akin to the respective set of past digital documents generated during the first period 502, a given past digital document of the respective other set of past digital documents also includes the respective value of the label 415 indicative of the past user interaction of the user 216 with the given past digital document.

As it can be appreciated, as the second plurality of training digital objects 407 is based on the given portion of the second historical data 507 spanning over the second period 504, which, in some non-limiting embodiments of the present technology, is shorter than the first period 502, in some non-limiting embodiments of the present technology, a total number of members in the second plurality of training digital objects 407 is smaller than that of the first plurality of training digital objects 405.

Further, according to certain non-limiting embodiments of the present technology, the server 202 can be configured to: (i) generate the second inputs 418 by applying the tokenizer 338 to the respective set of training digital objects of the second plurality of training digital objects 407 associated with the user 216; and (ii) feed the second input data 420 to the second ML model 404, thereby training the second ML model 404 to determine the respective likelihood values of the user 216 interacting with the in-use digital documents in a similar manner as described above with respect to the training of the first ML model 402. More specifically, by doing so, based on the respective set of training digital objects of the second plurality of training digital objects 407 associated with the user 216, the server 202 can be configured to train the second ML model 404, and hence the MLA 218, so that in response to applying the MLA 218 to the in-use digital documents, the second ML model 404 is configured to generate respective values of second outputs 420 including a second [CLS] output (not separately labelled) comprising a vector, values of which include respective likelihood values of the user 216 interacting with each of the in-use digital documents.

Further, using a similar approach as described above, the server 202 can be configured to train the MLA 218 to determine the respective values of the second outputs 420 associated with each other user of the digital platform 210. More specifically, in this regard, the server 202 can be configured to: (i) generate (or otherwise, retrieve) the respective values of the first outputs 410 associated with the given other user of the digital platform 210, as mentioned above; (ii) based on the first [CLS] output of the respective values of the first outputs 410, which is representative of the first historical data 505 associated with the given other user, generate a respective set of training digital objects of the second plurality of training digital objects 407, and (iii) based on the respective set of training digital objects of the second plurality of training digital objects 407, train the second ML model 404 to determine the respective likelihood values of the given other user interacting with the in-use documents.

Thus, by feeding to each one of the first and second ML models 402, 404, respective sets of training digital objects associated with each user of the digital platform, the server 202 is configured to jointly train both the first and second ML models 402, 404, thereby training the MLA 218. In some non-limiting embodiments of the present technology, the server 202 can be configured to jointly train the first and second ML models 402, 404 to generate respective values of the first and second outputs 410, 420, respectively, for each user of the digital platform 210 at a time. In these embodiments, the server 202 can be configured to consider both the first and second ML models 402, 404 as a single ML model and feed thereto various respective values of the first and second inputs 408, 418 for each of the users of the digital platform 210 at a time to determine the respective values of second outputs 420 that are indicative of the respective likelihood values of the users interacting with the in-use digital documents. In other non-limiting embodiments of the present technology, the server 202 can be configured to jointly train the first and second ML models 402, 404, by: (i) training the first ML model 402 to preliminarily generate the respective values of the first output 410 for all of the users of the digital platform 210; (ii) storing the respective values of the first output 410, for example, in the solid-state drive 120 of the server 202; and (iii) retrieving, for the given user of the digital platform 210, the respective values of the first outputs 410 for further training the second ML model 420 to generate the respective values of the second outputs 420.

Thus, by doing so, the server 202 can be configured to train the MLA 218 to determine the respective likelihood values of each user of the digital platform 210 interacting with the in-use digital documents, such as the set of digital documents 214. How the server 202 can be configured to apply the so trained MLA 218 will now be described.

In-Use Process

According to certain non-limiting embodiments of the present technology, during the in-use process, the server 202 can be configured to use the MLA 218, trained as described above, to rank the in-use digital documents, such as the set of digital documents 214 identified by the digital platform 210 in response to the given query 212 submitted thereto by the user 216. To that end, the server 202 can be configured to generate, based on the set of digital documents 214, an in-use digital object and feed the in-use digital object to the MLA 218.

Figure 6:
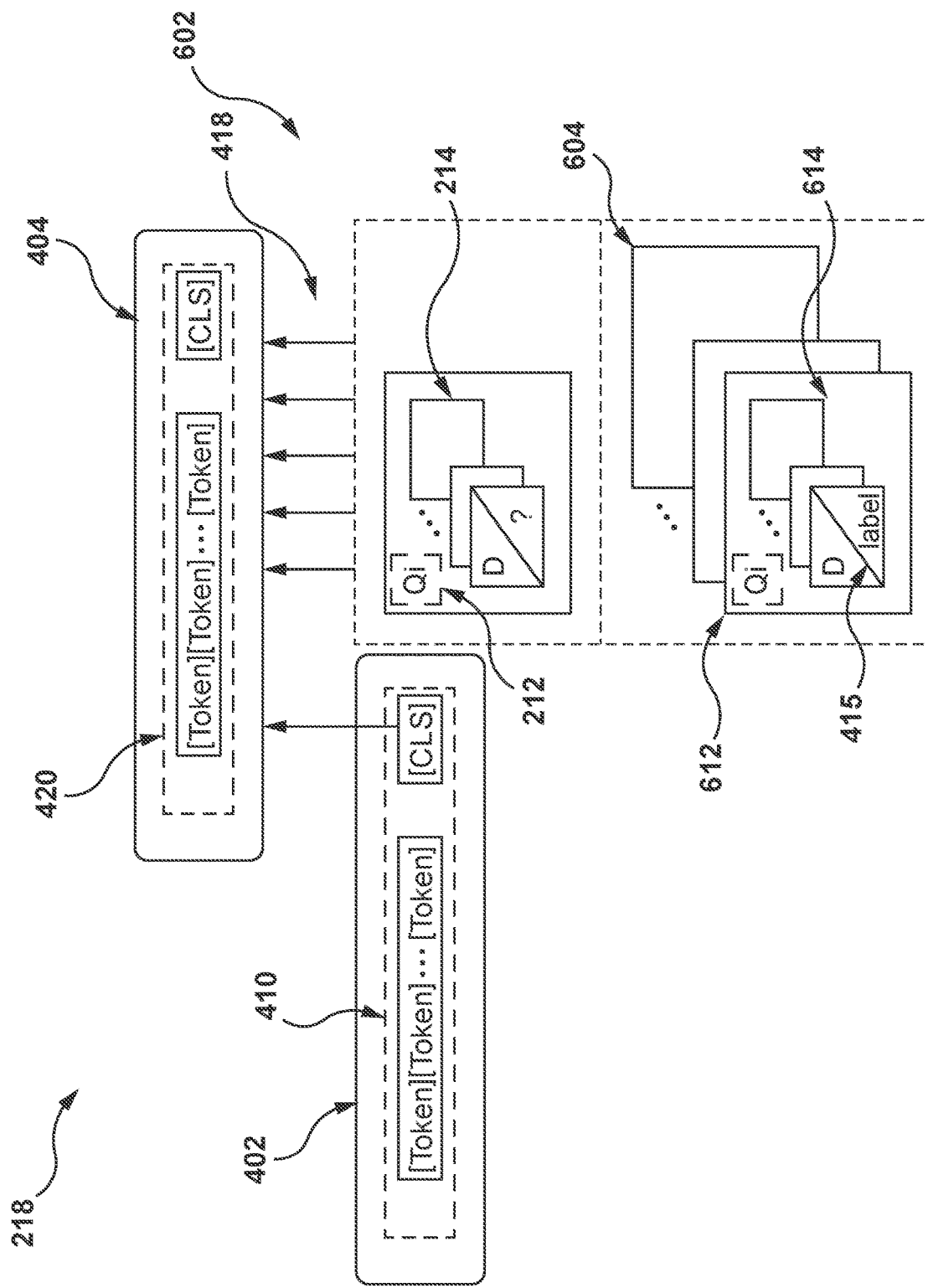
FIG. 6 depicts a schematic diagram of the server, present in the networked computing environment of FIG. 2, using the MLA of FIG. 4 to determine the respective likelihood values of the given user interacting with the digital documents of the digital platform, in accordance with certain non-limiting embodiments of the present technology.

With reference to FIG. 6, there is depicted a schematic diagram of the server 202 applying the MLA, trained as described above, to a given in-use digital object 602, in accordance with certain non-limiting embodiments of the present technology.

According to certain non-limiting embodiments of the present technology, to generate the given in-use digital object 602, aside from the given query 212 and the set of digital documents 214 associated therewith, the server 202 can be configured to retrieve in-use historical data 604 associated with the user 216. According to certain non-limiting embodiments of the present technology, the in-use historical data 604 is a portion of most recent historical data having been accumulated by a moment in time of submitting the given query 212 to the digital planform 210 over the second period 504, as described above with respect with the second historical data 507. Thus, in some non-limiting embodiments of the present technology, the in-use historical data 604 comprises historical data associated with user 216 that has been accumulated, by the moment of submitting the given query 212, over the second period 504 having a fixed duration, such as of 2-3 hours, 1 day, and the like. However, in other non-limiting embodiments of the present technology, the in-use historical data 604 comprises historical data associated with user 216 that has been accumulated, by the moment of submitting the given query 212, over the second period 504 having a duration of the current user session of the user 216 with the digital platform 210.

Similar to any other historical data described above, the in-use historical data 604 includes: (i) a plurality of past in-use queries, having been submitted by the user 216, over the second period 504 by the moment of submitting the given query 212, such as a given past in-use query 612; (ii) a respective plurality of past in-use digital documents 614 responsive to the given past in-use query 612; and (iii) respective values of the label 415 indicative of the user interactions of the user 216 with each one of the respective plurality of past in-use digital documents 614.

Further, according to certain non-limiting embodiments of the present technology, the server 202 can be configured to retrieve the respective values of the first outputs 410 of the first ML model 402 associated with the user 216 generated as described above with respect to the training the MLA 218.

In some non-limiting embodiments of the present technology, the server 202 can be configured to update the respective values of the first outputs 410 associated with each user of the digital platform 210 by updating the first historical data 505 associated with the given user, such as the user 216, based on which the server 202 causes the first ML model 402 to generate the respective set of training digital objects of the first outputs 410 associated with the user 216. In some non-limiting embodiments of the present technology, the server 202 can be configured to update the first historical data 505 associated with the user 216 by extending the first period 502, during which the first historical data 505 is to be accumulated, towards the moment in time of submitting the query 212. For example, the server 202 can be configured to extend the first period 502 to a beginning of retrieval of the in-use historical data 604. In other non-limiting embodiments of the present technology, the server 202 can be configured to leave the duration of the first period 502 unchanged, however, shift the first period 502 towards the moment in time of submitting the query 212. By doing so, in some non-limiting embodiments of the present technology, the server 202 can be configured to update the first historical data 505 associated with the user 216 from time to time, such as regularly, for example, a predetermined number of times (such as once, twice, and the like) a day, a week, or a month. However, in other non-limiting embodiments of the present technology, the server 202 can be configured to update the first historical data 505 prior to generating each in-use digital object.

Thus, the server 202 can be configured to generate the given in-use digital object 602 including: (i) the given query 212; (ii) the set of digital documents 214; (iii) the plurality of past in-use queries; (iv) respective pluralities of past in-use digital documents, such as the respective plurality of past in-use digital documents 614 responsive to the given past in-use query 612, including respective values of the label 415; and (v) the respective values of the first outputs 410, including the first [CLS] outputs representative of the first historical data 505, associated with the user 216, as mentioned above. In additional non-limiting embodiments of the present technology, the given in-use digital object 602 may further include metadata associated with the queries and the digital documents, as described above.

Further, as mentioned above with respect to training the second ML model 404, by using the tokenizer 338, the server 202 is configured to tokenize the given in-use digital object 602 to generate the second inputs 418 for feeding to the second ML model 402. In response, the second ML model 402 is configured to generate respective in-use values of the second outputs 420, the second [CLS] output of which includes a vector, a given value of which is the respective likelihood value of the user 216 interacting with a respective digital document of the set of digital documents 214.

In some non-limiting embodiments of the present technology (not depicted), the server 202 can be configured to generate the given in-use digital object 602 without including therein the set of digital documents 214. In these embodiments, the server 202 can be configured to: (i) generate a vector representation of the set of digital documents 214 separately, such as using an embedding algorithm; and (ii) concatenate the vector representation of the set of digital documents 214 and the second [CLS] output of the second ML model 404 generated in response to feeding thereto the given in-use digital object 602, thereby determining the respective likelihood values of the user 216 interacting with the each one of the set of digital documents 214.

It is not limited how the embedding algorithm can be implemented and depends generally on a type of the given digital object. For example, if the given digital document is a web text document, the embedding algorithm can include one of Word2Vec text embedding algorithm, a GloVe text embedding algorithm, and the like. In another example, where the given digital document is an audio feed, the embedding algorithm can include an acoustic embedding algorithm, including, without limitation, a Seq2Seq Autoencoder acoustic embedding algorithm, a Convolutional Vector Regression acoustic embedding algorithm, a Letter-ngram acoustic embedding algorithm, an LSTM-based acoustic embedding algorithm, and the like. Further, it is also not limited how the server 202 can be configured to concatenate the vector representation of the set of digital documents 214 and the second [CLS] output, and in some non-limiting embodiments of the present technology, can include a scalar multiplication of vectors, as an example.

Further, the server 202 can be configured to rank the set of digital documents 214 in accordance with the so determined respective likelihood values and present the set of digital documents 214 to the user 216 in response to the given query 212.

Thus, the architecture of the MLA 218 including two interjoined ML models, such as the first and second ML models 402, 404 thus allows considering a greater amount of historical data of the user interactions with the past digital documents, which may hence allow to increase accuracy in determining the respective likelihood values of the users interacting with the in-use digital documents. At the same time, this architecture allows offline processing, by the server 202, a greater portion of the historical data, accumulated over a longer period, such as the first historical data 505 mentioned above, which may thus help save computational resources of the server 202 in real time, thereby allowing for greater efficiency in providing the ranked search results to the users. Both these features may provide for better user experience of the users interacting with the digital platform 210.

Method

Figure 7:
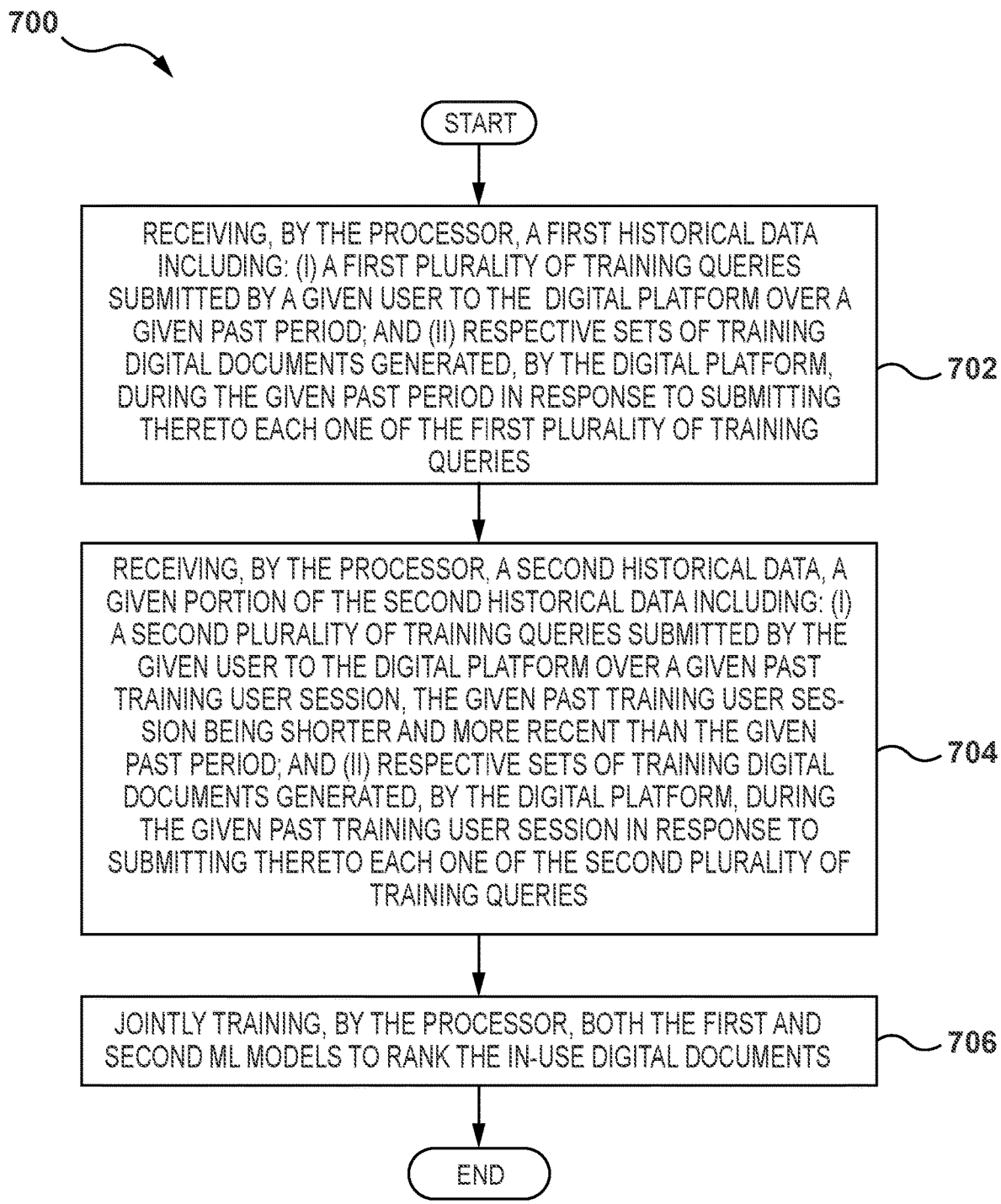
FIG. 7 depicts a flowchart diagram of a method of training the MLA of FIG. 4 to determine the respective likelihood values of the given user interacting with the digital documents, in accordance with certain non-limiting embodiments of the present technology.

Given the architecture and the examples provided hereinabove, it is possible to execute a method for training an MLA to rank digital documents, such as the MLA 218 described above. With reference now to FIG. 7, there is depicted a flowchart diagram of a method 700, according to certain non-limiting embodiments of the present technology. The method 700 may be executed by the server 202.

As mentioned hereinabove, in some non-limiting embodiments of the present technology, the MLA 218 can comprise two interjoined ML models. In some non-limiting embodiments of the present technology, each one of the two ML models can comprise a transformer-based NN ML model, such as the first and second ML models 402, 404 described above with reference to FIGS. 3 and 4.

Step 702: Receiving, by the Processor, a First Historical Data Including: (I) A First Plurality of Training Queries Submitted by a Given User to the Digital Platform Over a Given Past Period; and (II) Respective Sets of Training Digital Documents Generated, by the Digital Platform, During the Given Past Period in Response to Submitting Thereto Each One of the First Plurality of Training Queries The method 700 commences at step 702 with the server 202 being configured to receive, such as from electronic devices of the users of the digital platform 210, the first historical data 505 mentioned associated with each user of the digital platform 210, such as the user 216. As mentioned hereinabove with reference to FIG. 5, the first historical data 505 associated with the user 216 can be accumulated over the first period 502, which can be comparatively long, such as one or more weeks, months, or even years.

According to certain non-limiting embodiments of the present technology, the first historical data 505 associated with the user 216 includes data of the past searches of the user 216 at the digital platform 210, and can thus include: (i) a plurality of past queries submitted by the user 216 to the digital platform 210 over the first period 502, such as the given past query 412; (ii) respective sets of past digital documents identified by the digital platform 210 as being responsive to each one of the plurality of past queries submitted over the first period 502, such as the respective set of past digital documents 414 responsive to the given past query 412; and (iii) respective values of the label 415 indicative of the past user interactions with each past digital document during the first period 502.

According to some non-limiting embodiments of the present technology, the past user interaction of the user 216 with the given past digital document of the respective set of past digital documents 414 may include at least one of: (i) a click of the user 216 on the given past digital document; (ii) a long click on the given past digital document, that is, remaining in the given past digital document after clicking thereon for a predetermined period (such as 2, 5, or 10 minutes); (iii) dwelling on the given past digital document over a predetermined period (such as 10 seconds), as an example; (iv) adding the given past digital document in a list of favorite digital documents, such as bookmarks of the browser application, as an example; (v) coping a portion of the given past digital document, such as a portion of text or an image therefrom; and (v) saving at least a portion of the given past digital document to an internal memory of the electronic device 204.

The method 700 hence advances to step 704.

Step 704: Receiving, by the Processor, a Second Historical Data, a Given Portion of the Second Historical Data Including: (I) A Second Plurality of Training Queries Submitted by the Given User to the Digital Platform Over a Given Past Training User Session, the Given Past Training User Session Being Shorter and More Recent Than the Given Past Period; and (II) Respective Sets of Training Digital Documents Generated, by the Digital Platform, During the Given Past Training User Session in Response to Submitting Thereto Each One of the Second Plurality of Training Queries Further, at step 704, the server 202 can be configured to receive the second historical data 507 for each one of the users of the digital platform 210—such as the user 216. As mentioned hereinabove with reference to FIG. 5, the given portion of the second historical data 507 is similar data of the past searches conducted by the user 216 as the first historical data 505, however has been accumulated over the second period 504, which is shorter than the first period 502, and can comprise several hours or days, as an example. In some non-limiting embodiments of the present technology, the second period 504 can have a duration of the given past user session of the user 216 with the digital platform 210.

The method 700 hence advances to step 706.

Step 706: Jointly Training, by the Processor, Both the First and Second ML Models to Rank the In-Use Digital Documents At step 706, having received the first and second historical data 505, 507 for each user of the digital platform 210, the server 202 can now be configured to organize it in training digital objects for jointly training the first and second ML models 402, 404 of the MLA 218 to determine the respective likelihood values of the users interacting with the in-use digital documents.

More specifically, the server 202 can be configured to generate, based on the first historical data 505 associated with the user 216, the respective set of training digital objects of the first plurality of training digital objects 405 for training the first ML model 402. As mentioned above with reference to FIG. 4, the given training digital object of the first plurality of training digital objects 405 includes: (i) the given past query 412, which was submitted by the user 216 during the first period 502; (ii) the respective set of past digital documents 414; and (iii) and respective values of the label 415 indicative of past user interaction of the user 216 with each past digital document, as mentioned above.

Further, in some non-limiting embodiments of the present technology, using the tokenizer 338, the server 202 can be configured to generate, based on the given digital object associated with the user 216, the respective values of the first inputs 408 to the first ML model 402. Further, the server 202 can be configured to feed the respective values the first inputs 408 to the first ML model 402, thereby training the first ML model 402, as described above. As a result, the server 202 can be configured to determine the respective values of the first outputs 410 including the first [CLS] output, which is a vector representation of an entirety of the first historical data 505 associated with the user 216.

Further, in some non-limiting embodiments of the present technology, the server 202 can be configured to store the so determined values of the first outputs 410 associated with the user 216 including the first [CLS] output in the internal memory of the server 202, such as the solid-state drive 120.

Further, based on the so determined respective values of the first outputs 410 associated with the user 216 and the given portion of the second historical data 507 thereof, the server 202 can be configured to generate the respective set of training digital objects of the second plurality of training digital objects 407 for training the second ML model 404. More specifically, the given training digital object of the second plurality of training digital objects 407 includes: (i) the given past query submitted by the user 216 during the second period 504; (ii) the respective other set of past digital documents having been identified, by the digital platform 210, as being responsive to the given past query submitted during the second period 504; (iii) the respective values of the label 415 indicative of the past user interactions with each past digital documents during the second period 504; and (iv) the first [CLS] output of the respective values of the first outputs 410 of the first ML model 402, representative of the first historical data 505 associated with the user 216.

Further, according to certain non-limiting embodiments of the present technology, the server 202 can be configured to: (i) generate the second inputs 418 by applying the tokenizer 338 to the respective set of training digital objects of the second plurality of training digital objects 407 associated with the user 216; and (ii) feed the second input data 420 to the second ML model 404, thereby training the second ML model 404 to determine the respective likelihood values of the user 216 interacting with the in-use digital documents in a similar manner as described above with respect to the training of the first ML model 402.

Thus, by (i) determining the respective sets of the first and second pluralities of training digital objects 405, 407 for each user of the digital platform 210 and (ii) feeding the respective sets to the first and second ML model 402, 404, as described above, the server 202 is configured to jointly train both the first and second ML models 402, 404, thereby training the MLA 218. In some non-limiting embodiments of the present technology, the server 202 can be configured to jointly train the first and second ML models 402, 404 to generate respective values of the first and second outputs 410, 420, respectively, for each user of the digital platform 210 at a time. In other non-limiting embodiments of the present technology, the server 202 can be configured to jointly train the first and second ML models 402, 404, by: (i) training the first ML model 402 to preliminarily generate the respective values of the first output 410 for all of the users of the digital platform 210; (ii) storing the respective values of the first output 410, for example, in the solid-state drive 120 of the server 202; and (iii) retrieving, for the given user of the digital platform 210, the respective values of the first outputs 410 for further training the second ML model 420 to generate the respective values of the second outputs 420.

Further, after training the MLA 218 as described above, according to certain non-limiting embodiments of the present technology, the server 202 can be configured to use for determining for ranking the search results, such as the set of digital documents 214 identified by the digital platform 210 in response to the given query 212 submitted by the user 216. To that end, as mentioned hereinabove with reference to FIG. 6 in some non-limiting embodiments of the present technology, the server 202 can be configured to (i) generate, based on the given query 212 and the set of digital documents 214 the in-use historical data 604, the given in-use digital object 602; and (ii) apply thereto the MLA 218.

According to certain non-limiting embodiments of the present technology, the given in-use digital object 602 includes: (i) the given query 212; (ii) the set of digital documents 214; (iii) the plurality of past in-use queries; (iv) respective pluralities of past in-use digital documents, such as the respective plurality of past in-use digital documents 614 responsive to the given past in-use query 612, including respective values of the label 415; and (v) the respective values of the first outputs 410, including the first [CLS] outputs representative of the first historical data 505, associated with the user 216, as mentioned above. In additional non-limiting embodiments of the present technology, the given in-use digital object 602 may further include metadata associated with the queries and the digital documents, as described above.

In some non-limiting embodiments of the present technology, the server 202 can be configured to update the respective values of the first outputs 410 associated with each user of the digital platform 210 by updating the first historical data 505 associated with the given user, such as the user 216, based on which the server 202 causes the first ML model 402 to generate the respective set of training digital objects of the first outputs 410 associated with the user 216. In some non-limiting embodiments of the present technology, the server 202 can be configured to update the first historical data 505 associated with the user 216 by extending the first period 502, during which the first historical data 505 is to be accumulated, towards the moment in time of submitting the query 212. For example, the server 202 can be configured to extend the first period 502 to a beginning of retrieval of the in-use historical data 604. In other non-limiting embodiments of the present technology, the server 202 can be configured to leave the duration of the first period 502 unchanged, however, shift the first period 502 towards the moment in time of submitting the query 212. By doing so, in some non-limiting embodiments of the present technology, the server 202 can be configured to update the first historical data 505 associated with the user 216 from time to time, such as regularly, for example, a predetermined number of times (such as once, twice, and the like) a day, a week, or a month. However, in other non-limiting embodiments of the present technology, the server 202 can be configured to update the first historical data 505 prior to generating each in-use digital object.

Further, by using the tokenizer 338, the server 202 is configured to tokenize the given in-use digital object 602 to generate the respective values of the second inputs 418 for feeding to the second ML model 402. In response, the second ML model 402 is configured to generate respective in-use values of the second outputs 420, the second [CLS] output of which includes a vector, a given value of which is the respective likelihood value of the user 216 interacting with a respective digital document of the set of digital documents 214.

However, as mentioned further above, in some non-limiting embodiments of the present technology (not depicted), the server 202 can be configured to generate the given in-use digital object 602 without including therein the set of digital documents 214. In these embodiments, the server 202 can be configured to: (i) generate, using one of the implementations of the embedding algorithm mentioned above, the vector representation of the set of digital documents 214 separately; and (ii) concatenate the vector representation of the set of digital documents 214 and the second [CLS] output of the second ML model 404 generated in response to feeding thereto the given in-use digital object 602, thereby determining the respective likelihood values of the user 216 interacting with the each one of the set of digital documents 214.

Thus, certain embodiments of the method 700 allow considering greater amount of historical data for determining the respective likelihood values of the users interacting with the in-use digital documents of the digital platform 210 given limited computational resources of the server 202. Thus may thus allow increase accuracy and effectiveness of the search results ranking.

The method 700 hence terminates.

It will also be understood that, although the embodiments presented herein have been described with reference to specific features and structures, various modifications and combinations may be made without departing from such disclosures. For example, various optimizations that have been applied to neural networks, including transformers and/or BERT may be similarly applied with the disclosed technology. Additionally, optimizations that speed up in-use relevance determinations may also be used. For example, in some implementations, the transformer model may be split, so that some of the transformer blocks are split between handling a query and handling a document, so the document representations may be pre-computed offline and stored in a document retrieval index. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A computer-implementable method of training a machine-learning algorithm (MLA) to rank in-use digital documents at a digital platform, the MLA comprising a first ML model and a second ML model, the method being executable by a processor, the method comprising:
receiving, by the processor, a first historical data including: (i) a first plurality of training queries submitted by a given user to the digital platform over a given past period; and (ii) respective sets of training digital documents generated, by the digital platform, during the given past period in response to submitting thereto each one of the first plurality of training queries;
receiving, by the processor, a second historical data, a given portion of the second historical data including: (i) a second plurality of training queries submitted by the given user to the digital platform over a given past training user session, the given past training user session being shorter and more recent than the given past period; and (ii) respective sets of training digital documents generated, by the digital platform, during the given past training user session in response to submitting thereto each one of the second plurality of training queries,
a given training digital document generated during any one of the given past period and the given past training user session including a respective indication of a user interaction of the given user with the given training digital document; and
jointly training, by the processor, both the first and second ML models to rank the in-use digital documents, the training comprising:
organizing, by the processor, the first historical data into a first plurality of training digital objects, a given one of which includes: (i) a given one of the first plurality of training queries; and (ii) the respective set of training digital documents generated in response to the given one of the first plurality of training queries during the given past period;
feeding, by the processor, the first plurality of training digital objects to the first ML model to train the first ML model to generate a vector representation of the first historical data;
generating, by the processor, based on the second historical data, a second plurality of training digital objects, a given one of which includes: (i) a given one of the second plurality of training queries; (ii) the respective set of training digital documents generated in response to the given one of the second plurality of training queries during the given training user session; and (iii) the vector representation of the first historical data; and
feeding, by the processor, the second plurality of training digital objects to the second ML model to train the second ML model to determine a respective likelihood value of the given user interacting with a given in-use digital document.

2. The method of claim 1, wherein a number of members of the first plurality of training digital objects is greater than a number of members of the second plurality of training digital objects.

3. The method of claim 1, wherein the user interaction of the given user with the given training digital document comprises at least one: (i) selecting the given training digital document from a respective set of training digital documents; (ii) dwelling on the given digital document; (iii) adding the given training digital document in favorites; (iv) engaging with the given training digital document for longer than a threshold engagement period; and (v) saving at least a portion of content of the given training digital document.

4. The method of claim 1, further comprising:
receiving, by the processor, a given in-use query submitted by the given user to the digital platform during a current in-use user session;
retrieving, by the processor, a respective set of in-use digital documents responsive to the given in-use query;
retrieving, by the processor, in-use historical data including: (i) a plurality of past in-use queries submitted by the given user to the digital platform over the current in-use user session prior to submitting the given in-use query; (ii) respective sets of past in-use training digital documents generated, by the digital platform, in response to submitting thereto each one of the plurality of past in-use training queries, a given past in-use training digital document of the respective sets of past in-use digital documents including the respective indication of the user interaction of the given user with the given past in-use training digital document;
generating, by the processor, an in-use digital object including: (i) the given in-use query; (ii) the respective set of in-use digital documents; (iii) the plurality of past in-use queries; (iv) respective sets of past in-use training digital documents; and (v) the vector representation of the first historical data;
feeding, by the processor, the in-use digital object to the second ML model of the MLA to determine, for each one of the set of in-use digital documents, the respective likelihood value of the given user interacting therewith; and
ranking, by the processor, each one of the set of in-use digital documents in accordance with the respective likelihood values associated therewith.

5. The method of claim 4, further comprising, prior to the retrieving the vector representation of the first historical data, updating, by the processor, the first historical data.

6. The method of claim 5, wherein the updating comprises at least one of shifting and extending the given past period towards a moment of submitting the given in-use query.

7. The method of claim 5, wherein the updating is executed at a predetermined frequency.

8. The method of claim 1, wherein each one of the first and second ML models is a neural network having an encoder-decoder architecture.

9. The method of claim 8, wherein the neural network is Transformer-based neural network.

10. A server for training a machine-learning algorithm (MLA) to rank in-use digital documents at a digital platform, the MLA comprising a first ML model and a second ML model, the server comprising a non-transitory computer-readable memory storing instructions; and a processor, which, upon executing the instructions, is configured to:
receive a first historical data including: (i) a first plurality of training queries submitted by a given user to the digital platform over a given past period; and (ii) respective sets of training digital documents generated, by the digital platform, during the given past period in response to submitting thereto each one of the first plurality of training queries;
receive a second historical data, a given portion of the second historical data including: (i) a second plurality of training queries submitted by the given user to the digital platform over a given past training user session, the given past training user session being shorter and more recent than the given past period; and (ii) respective sets of training digital documents generated, by the digital platform, during the given past training user session in response to submitting thereto each one of the second plurality of training queries, a given training digital document generated during any one of the given past period and the given past training user session including a respective indication of a user interaction of the given user with the given training digital document; and jointly train both the first and second ML models to rank the in-use digital documents, by:

organizing the first historical data into a first plurality of training digital objects, a given one of which includes: (i) a given one of the first plurality of training queries; and (ii) the respective set of training digital documents generated in response to the given one of the first plurality of training queries during the given past period;

feeding the first plurality of training digital objects to the first ML model to train the first ML model to generate a vector representation of the first historical data;

generating, based on the second historical data, a second plurality of training digital objects, a given one of which includes: (i) a given one of the second plurality of training queries; (ii) the respective set of training digital documents generated in response to the given one of the second plurality of training queries during the given training user session; and (iii) the vector representation of the first historical data; and feeding the second plurality of training digital objects to the second ML model to train the second ML model to determine a respective likelihood value of the given user interacting with a given in-use digital document.

11. The server of claim 10, wherein a number of members of the first plurality of training digital objects is greater than a number of members of the second plurality of training digital objects.

12. The server of claim 10, wherein the user interaction of the given user with the given training digital document comprises at least one: (i) selecting the given training digital document from a respective set of training digital documents; (ii) dwelling on the given digital document; (iii) adding the given training digital document in favorites; (iv) engaging with the given training digital document for longer than a threshold engagement period; and (v) saving at least a portion of content of the given training digital document.

13. The server of claim 10, wherein the processor is further configured to:

receive a given in-use query submitted by the given user to the digital platform during a current in-use user session;

retrieve a respective set of in-use digital documents responsive to the given in-use query;

retrieve in-use historical data including: (i) a plurality of past in-use queries submitted by the given user to the digital platform over the current in-use user session prior to submitting the given in-use query; (ii) respective sets of past in-use training digital documents generated, by the digital platform, in response to submitting thereto each one of the plurality of past in-use training queries, a given past in-use training digital document of the respective sets of past in-use digital documents including the respective indication of the user interaction of the given user with the given past in-use training digital document;

generate an in-use digital object including: (i) the given in-use query; (ii) the respective set of in-use digital documents; (iii) the plurality of past in-use queries; (iv) respective sets of past in-use training digital documents; and (v) the vector representation of the first historical data;

feed the in-use digital object to the second ML model of the MLA to determine, for each one of the set of in-use digital documents, the respective likelihood value of the given user interacting therewith; and rank each one of the set of in-use digital documents in accordance with the respective likelihood values associated therewith.

14. The server of claim 13, wherein, prior to retrieving the vector representation of the first historical data, the processor is further configured to update the first historical data.

15. The server of claim 14, wherein the processor is configured to update the first historical data by executing at least one of shifting and extending the given past period towards a moment of submitting the given in-use query.

16. The server of claim 15, wherein the processor is configured to update the first historical data at a predetermined frequency.

17. The server of claim 10, wherein each one of the first and second ML models is a neural network having an encoder-decoder architecture.

18. The server of claim 17, wherein the neural network is Transformer-based neural network.

* * * * *